(12) United States Patent
Cun et al.

(10) Patent No.: US 11,692,843 B2
(45) Date of Patent: *Jul. 4, 2023

(54) GUIDED NAVIGATION FOR PERSONAL TRANSPORT DEVICES

(71) Applicant: Honda Motor Co., Ltd., Tokyo (JP)

(72) Inventors: David Cun, Fountain Valley, CA (US); Matthew Staal, Torrance, CA (US); Peter Wendt, Redondo Beach, CA (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/883,854

(22) Filed: Aug. 9, 2022

(65) Prior Publication Data

US 2022/0381575 A1 Dec. 1, 2022

Related U.S. Application Data (63) Continuation of application No. 16/903,869, filed on Jun. 17, 2020, now Pat. No. 11,486,725.

(51) Int. Cl.
*G01C 21/36* (2006.01)
*B62K 23/02* (2006.01)
(Continued)

(52) U.S. Cl.
CPC ............ *G01C 21/365* (2013.01); *B62K 11/14* (2013.01); *B62K 23/02* (2013.01);
(Continued)

(58) Field of Classification Search
CPC .............. G01C 21/365; G01C 21/3608; G01C 21/3617; G01C 21/3626; B62K 11/14; B62K 23/02; B60Q 2400/50
See application file for complete search history.

(56) References Cited

U.S. PATENT DOCUMENTS 8,325,027 B2 12/2012 Tee et al.
9,969,325 B2 5/2018 Lection et al.
(Continued)

FOREIGN PATENT DOCUMENTS

CN 101488308 B 1/2011
CN 202345825 U 7/2012
(Continued)

OTHER PUBLICATIONS

Espacenet Machine Translation of published CN Patent No. 101488308 B.

(Continued)

*Primary Examiner* — John A Tweel, Jr.
(74) *Attorney, Agent, or Firm* — Plumsea Law Group, LLC (57) ABSTRACT

A method for providing guided navigation for personal transport devices is described. In one embodiment, the method includes providing a list of predetermined destinations associated with a geographic area, projecting directions to one or more of the destinations on a ground surface located in front of a personal transport device, and providing an option to a user of the personal transport device to select between at least two different destinations. A direction associated with each destination of the at least two destinations may be projected on the ground surface located in front of the personal transport device. The method also includes receiving an input from the user indicating a selection of one of the at least two different destinations and projecting directions to the selected destination on the ground surface located in front of the personal transport device to guide the user to the selected destination.

20 Claims, 7 Drawing Sheets

(51) Int. Cl.
  *B62K 11/14* (2006.01)
  *H04W 4/80* (2018.01)
  *H04W 4/40* (2018.01)

(52) U.S. Cl.
  CPC ..... *G01C 21/3608* (2013.01); *G01C 21/3617* (2013.01); *G01C 21/3629* (2013.01); *G01C 21/3664* (2013.01); *H04W 4/40* (2018.02); *H04W 4/80* (2018.02); *B60Q 2400/50* (2013.01)

(56) References Cited

U.S. PATENT DOCUMENTS

| | | | |
|---|---|---|---|
| 9,978,280 B2 | 5/2018 | Lee et al. | |
| 10,028,356 B2 | 7/2018 | Luk et al. | |
| 10,124,847 B2 | 11/2018 | Pearce | |
| 11,486,725 B2 * | 11/2022 | Cun | B62J 50/22 |
| 2009/0012706 A1 | 1/2009 | Kim | |
| 2014/0203923 A1 | 7/2014 | Lai et al. | |
| 2016/0330417 A1 | 11/2016 | Lin et al. | |
| 2019/0002052 A1 | 1/2019 | Chen et al. | |
| 2019/0232147 A1 | 8/2019 | Aaltonen et al. | |
| 2020/0039594 A1 | 2/2020 | Ebrahemi | |
| 2021/0155153 A1 | 5/2021 | Wendt | |

FOREIGN PATENT DOCUMENTS

| | | |
|---|---|---|
| CN | 105620614 B | 3/2019 |
| DE | 102016009839 A1 | 2/2017 |
| JP | 3077454 U | 11/2000 |
| KR | 100924155 B1 | 10/2009 |
| KR | 101724211 B1 | 4/2017 |
| KR | 101825074 B1 | 2/2018 |

OTHER PUBLICATIONS

Espacenet Machine Translation of published CN Patent No. 105620614 B.
Espacenet Machine Translation of published CN Patent No. 202345825 U.
Espacenet Machine Translation of published DE Patent No. 102016009839 A1.
Orbit.com Machine Translation of published JP Patent No. 3077454 U.
Espacenet Machine Translation of published KR Patent No. 100924155 B1.
Espacenet Machine Translation of published KR Patent No. 101724211 B1.
Espacenet Machine Translation of published KR Patent No. 101825074 B1.

* cited by examiner

GUIDED NAVIGATION FOR PERSONAL TRANSPORT DEVICES

CROSS-REFERENCE TO RELATED APPLICATION

This application is a continuation of and claims benefit to U.S. patent application Ser. No. 16/903,869, filed on Jun. 17, 2020 and titled "Guided Navigation for Personal Transport Devices", the disclosure of which application is incorporated by reference herein in its entirety.

BACKGROUND

This disclosure relates generally to vehicles, and in particular to a system and method for providing guided navigation for personal transport devices.

With rising prices of gasoline and automobiles, many people may turn to other more cost efficient modes of transportation such as, for example, mopeds, bicycles, scooters and, more recently, personal transport devices, including electrified and non-electrified devices, such as stand-up electric scooters or kick scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Sometimes, users of personal transport devices may want to use the devices to explore an area to visit different tourist sites or other destinations. Conventional methods for renting personal transport devices do not include convenient mechanisms for these users to determine which sites to visit in a given area or a way to receive directions to reach those sites. Typically, users may often need to rely on their cellphone or other mobile device for navigation. This solution may be difficult for some users to manage while riding a personal transport device.

Accordingly, there is a need in the art for an improved system and method for providing guided navigation for personal transport devices.

SUMMARY

In one aspect, a method for providing guided navigation to destinations in a geographic area is provided. The method may include providing a list of predetermined destinations associated with a geographic area. The method may also include projecting directions to one or more of the predetermined destinations on a ground surface located in front of a personal transport device. The method may further include providing an option to a user of the personal transport device to select between at least two different destinations from the predetermined destinations. A direction associated with each destination of the at least two destinations may be projected on the ground surface located in front of the personal transport device. The method also may include receiving an input from the user indicating a selection of one of the at least two different destinations. The method may further include projecting directions to the selected destination on the ground surface located in front of the personal transport device to guide the user to the selected destination.

In another aspect, a method for providing guided navigation to a user of a personal transport device is provided. The method may include providing a personal transport device including a projector. The method may also include projecting directions to one or more of a plurality of destinations in a geographic area on a ground surface located in front of the personal transport device. The method may include providing a selection mechanism to a user of the personal transport device to select between at least two different destinations from the plurality of destinations. A direction associated with each destination of the at least two destinations may be projected on the ground surface located in front of the personal transport device. The method may also include receiving an input from the selection mechanism by the user indicating a selection of one of the at least two different destinations. The method may further include projecting directions to the selected destination on the ground surface located in front of the personal transport device to guide the user to the selected destination.

In another aspect, a personal transport device for providing guided navigation to a user is provided. The personal transport device may include a platform configured for a user to stand on the personal transport device. The personal transport device may also include a neck extending from the platform to handlebars configured for the user to hold while riding the personal transport device. The personal transport device may further include a projector mounted on the personal transport device. The projector may be configured to project directions to one or more of a plurality of destinations in a geographic area on a ground surface located in front of the personal transport device. The personal transport device may further include a selection mechanism provided on the personal transport device. The selection mechanism may be configured to allow a user of the personal transport device to select between at least two different destinations from the plurality of destinations by choosing a direction associated with each destination of the at least two destinations that is projected on the ground surface located in front of the personal transport device.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Methods and systems for providing guided navigation for personal transport devices are described herein. The techniques of the present embodiments may be used to allow users of personal transport devices to receive guided navigation to one or more destinations in a given area and to easily select between two or more destinations or sites using different selection techniques.

The example embodiments are described herein with reference to a personal transport device in the form of an electric scooter. As used herein, an electric scooter is a term used mainly to describe a stand-up kick scooter that is electrically powered. For example, this is a type of personal transport device that is gaining ridership in many locations. The principles of the example embodiments described herein may be applied to electric scooters or other types or form of personal transport devices, including powered devices, such as devices powered by electric motors or combustion engines, and non-powered devices, such as devices driven using a mechanical apparatus or manually propelled by users. Examples of personal transport devices include, but are not limited to, scooters, bicycles, unicycles, mopeds, skateboards, kickboards, wheelchairs, personal transporters, or the like.

The present embodiments allow for users of personal transport devices to receive guided navigation without requiring the user to keep his or her eyes focused on a display screen. In addition, the various different selection techniques described herein provide mechanisms for the user to choose between two or more destinations or sites without needing to touch a display screen to make the selection. As will be described herein, the features of the present embodiments provide projected navigation directions on the ground in front of the personal transport device to guide the user to various destinations or sites within a geographic area. With this arrangement, guided navigation for personal transport devices may be provided.

Figure 1:
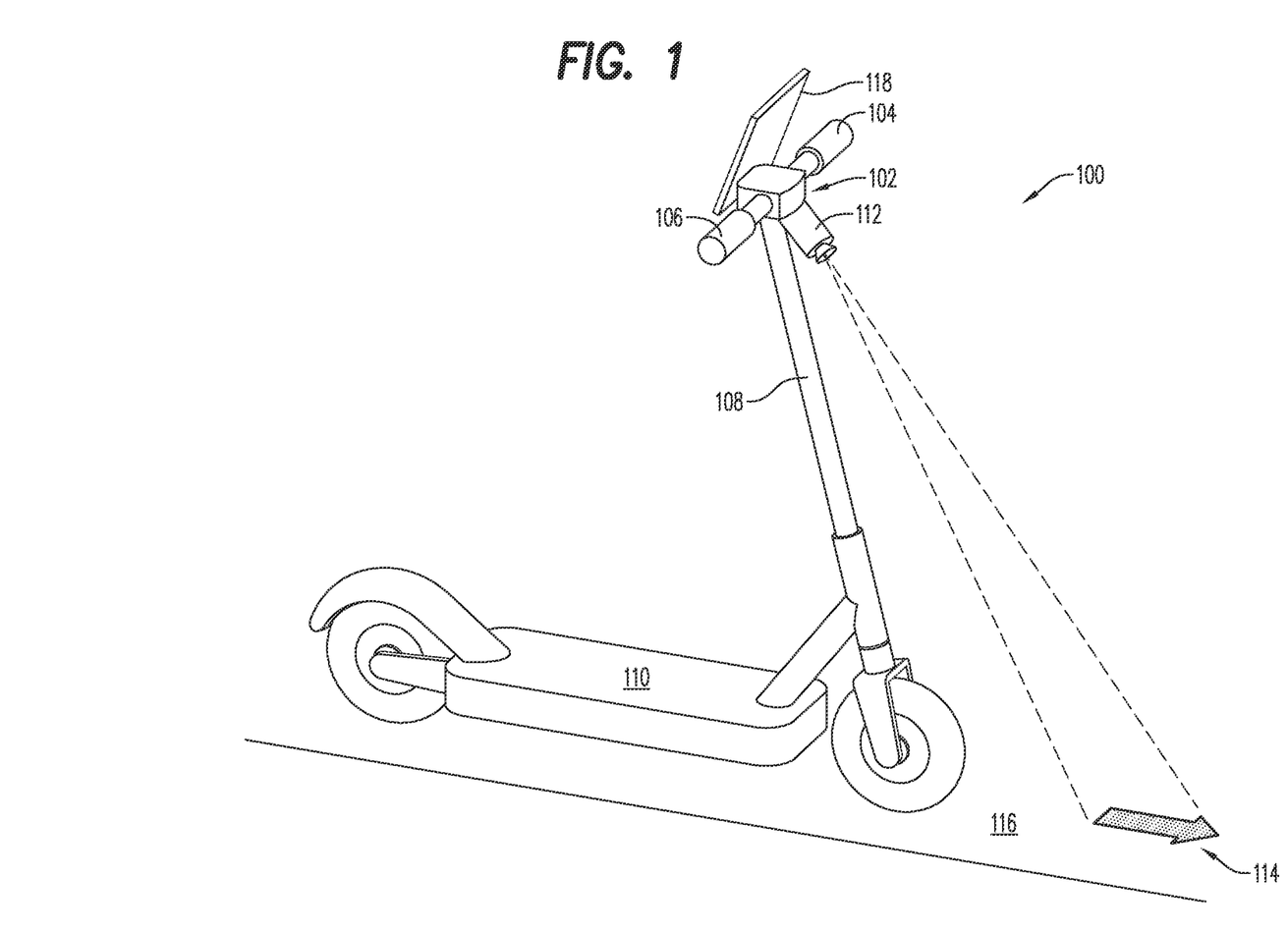
FIG. 1 is a representative view of an example embodiment of a personal transport device with guided navigation in accordance with aspects of the present disclosure.

Referring now to FIG. 1, an example embodiment of a personal transport device 100 in the form of a scooter is shown. In some embodiments, personal transport device 100 (also referred to as "scooter 100") may be provided by a service provider that allows users to rent personal transport devices. In the exemplary embodiments described herein, personal transport device 100 is in the form of an electric scooter, however, it should be understood that the principles of the example embodiments may be applied to any type or form of personal transport device, as described above.

In this embodiment, scooter 100 includes handlebars 102 having a pair of grips for hands of a user, including a left grip 104 and a right grip 106. As shown in FIG. 1, handlebars 102 are connected to a neck 108 that extends up from a deck or platform 110 on which a user is configured to stand to ride scooter 100. In an example embodiment, scooter 100 further includes a projector 112. In this embodiment, projector 112 is attached to a top of neck 108 of scooter 100 near handlebars 102. As will be described in more detail below, projector 112 is configured to project or illuminate directions onto a ground surface in front of scooter 100 so that a user may receive directions to a destination while riding scooter 100.

For example, as shown in FIG. 1, projector 112 projects or illuminates a projected image 114 (e.g., shown here in the form of an arrow) onto a ground surface 116 on which scooter 100 is traveling. Ground surface 116 may be a road, street, sidewalk, path, etc. Projected image 114 is projected onto ground surface 116 in front of scooter 100 so that a user riding on scooter 100 may be guided by projected image 114 to navigate to a destination. In some embodiments, projector 112 may be configured to change the brightness or intensity of projected image 114 based on one or more factors, such as ambient light, surface type or condition, user preferences, etc. Additionally, projector 112 may also be configured to change the distance in front of scooter 100 that projected image 114 is located, for example, based on the travel speed of scooter 100, a remaining distance to a turn or navigation waypoint, or other factors.

In one embodiment, scooter 100 may include a display screen 118. Display screen 118 may be part of scooter 100 or may be associated with a separate device, such as a smart phone or other type of portable computing device, associated with a user of personal transport device 100. In an exemplary embodiment, personal transport device or scooter 100 may include a dock or other apparatus for receiving a mobile device, such as the mobile device or smart phone belonging to a user of scooter 100. With an application installed on the user's mobile device, the mobile device may function as display screen 118 for personal transport device 100 and provides a communication interface to an onboard controller or processor (if present) of personal transport device 100, as well as allowing communication with a communication interface and/or a user interface of the service provider renting personal transport device 100 to the user.

In this embodiment, display screen 118 is attached or connected to handlebars 102 on top of neck 108. In other embodiments, display screen 118 may be located in another part of scooter 100. In the embodiments that include display screen 118, display screen 118 may allow a user to interact with various settings (e.g., settings for projector 112, user preferences, and other customizable settings for scooter 100) as well as make selections for navigation and/or options associated with renting scooter 100. In the present embodiments, however, display screen 118 is optional and is not required for a user to use scooter 100.

As described above, communication between the user's mobile device and the onboard controller or processor of personal transport device 100, as well as with a communication interface and/or a user interface of the service provider, may be accomplished by a variety of ways such as Bluetooth® or other types of short-range wireless or near-field communication protocols. Display screen 118 of the mobile device may provide information to the user of personal transport device 100 regarding, for example, battery life, status of lighting units, distance traveled, speed, navigation information, hazard information and roadway infrastructure signals and readings. The application on the mobile device may also monitor and/or control some of the operating systems of personal transport device 100. For example, information associated with braking, speed, location, heading, turn status, etc. may be monitored and/or controlled via the application on the mobile device.

In some embodiments, personal transport device 100 may also include other components that are conventional for the type or form of transport device being used. For example, different types or forms of personal transport devices may have different numbers of wheels, may be provided with seats or without seats, may have storage capacity, or may have accommodations for additional riders. In this embodiment, scooter 100 has two wheels and is not provided with a seat. In other embodiments, however, such as where the personal transport device is in the form of an electric skateboard, it may have four wheels. It should be understood that the arrangement of components will vary based on the particular type and/or form of personal transport device being used.

Figure 2:
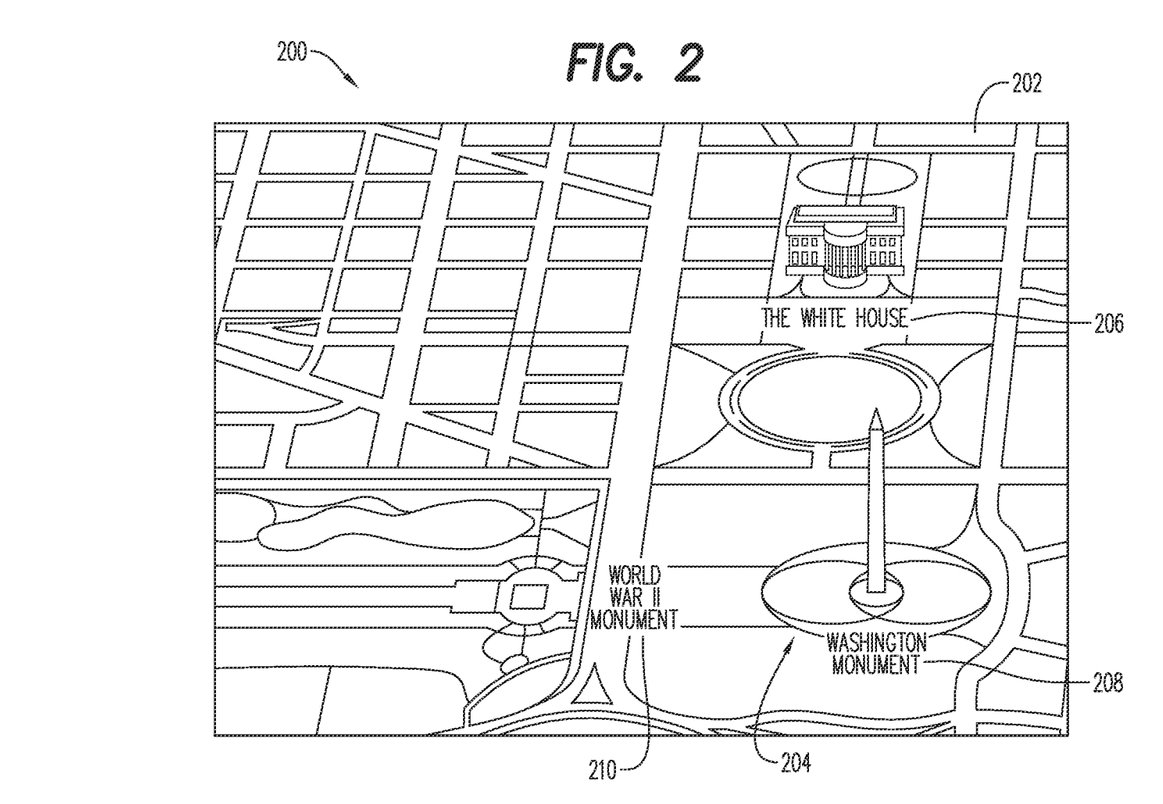
FIG. 2 is a schematic view of an example environment in which guided navigation for personal transport devices may be provided in accordance with aspects of the present disclosure.

Referring now to FIG. 2, an example geographic area 200 in which guided navigation for personal transport devices may be provided in accordance with the present embodiment is shown. The techniques of the present embodiments may be used to provide guided navigation to users of personal transport devices to one or more destinations in a given geographic area and to easily select between two or more destinations or sites using different selection techniques. In an example embodiment, guided navigation may be provided in a geographic area or venue that includes a plurality of destinations. For example, a geographic area or venue may include cities, national monuments or parks, theme parks, or other tourist attractions. These places typically include a plurality of sites or places of interest that may be potential destinations for users of personal transport devices.

In some embodiments, a list of predetermined destinations associated with the geographic area or venue may be provided so that the user can select between two or more destinations and receive guided navigation to the selected destination. As shown in FIG. 2, geographic area 200 is a city, such as Washington, D.C., represented by a map 202 that includes a plurality of destinations 204. In this embodiment, the plurality of destinations 204 on map 202 includes at least a first destination 206 (e.g., The White House), a second destination 208 (e.g., Washington Monument), and a third destination 210 (e.g., World War II Monument). It should be understood that for the purposes of illustration, plurality of destinations 204 shown on map 202 includes only three example destinations, however, a map of a given geographic area may include a large number of potential destinations that may be of interest to a user.

In an example embodiment, a list of predetermined destinations associated with geographic area 200 may be provided to a user. For example, the list of predetermined destinations may be provided by the service provider through the application running on the user's mobile device or may be preloaded on a storage device or memory associated with a personal transport device located within the geographic area. Additionally, in some embodiments, the list of predetermined destinations associated with the geographic area may be based on user preferences, such as a preference for museums, a preference for outdoor sites, or other customizable user preferences. With this arrangement, a user of a personal transport device within the geographic area may have access to a list of predetermined destinations associated with that geographic area to choose from so that the user receives guided navigation to the selected destination(s).

Figure 3:
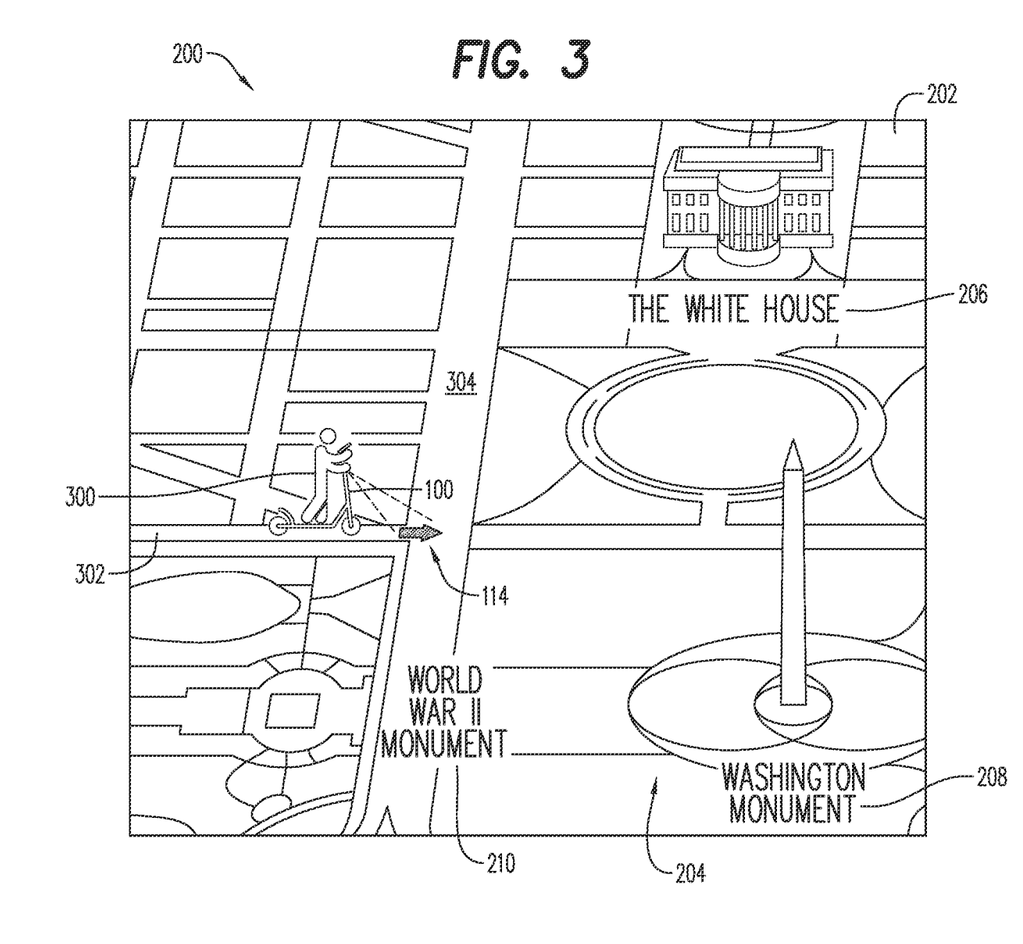
FIG. 3 is a representative view of an example embodiment of guided navigation of a personal transport device in the example environment in accordance with aspects of the present disclosure.

Referring now to FIG. 3, an example embodiment of guided navigation of a personal transport device in example geographic area 200 is shown. As shown in FIG. 3, a user 300 is traveling within geographic area 200 on personal transport device 100 (e.g., scooter 100). In this embodiment, geographic area 200 includes plurality of destinations 204, including first destination 206, second destination 208, and third destination 210. User 300 is shown riding scooter 100 along a first road 302 and is following projected image 114 projected onto first road 302 by projector 112 (shown in FIG. 1) on scooter 100. As user 300 approaches a second road 304 which is a cross road of first road 302, the guided navigation according to the example embodiments will provide user 300 with an option to select between at least two different destinations from plurality of destinations 204, as will be described below.

Figure 4:
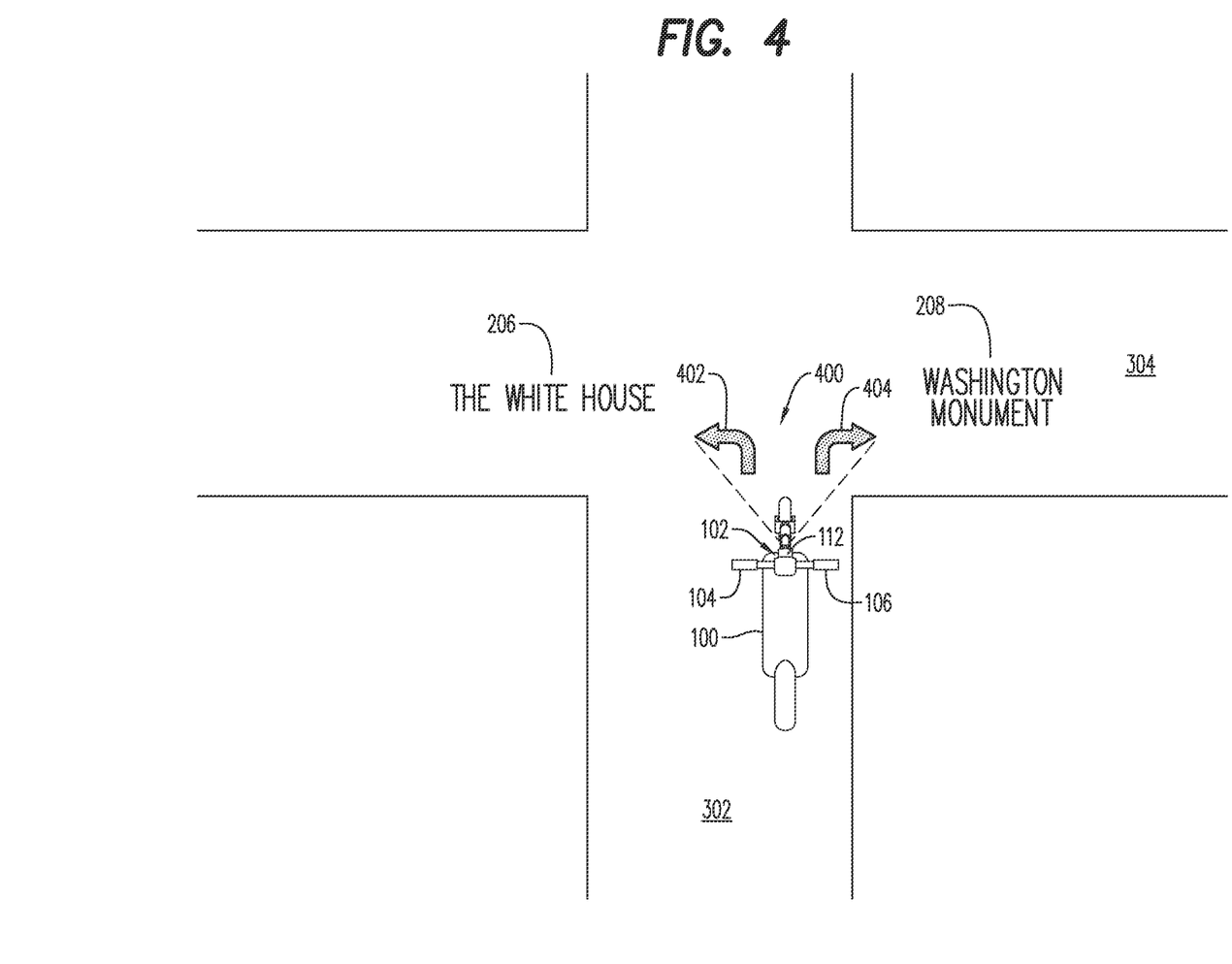
FIG. 4 is a schematic view of an example embodiment of a decision point for guided navigation of a personal transport device in accordance with aspects of the present disclosure.

For example, as shown in FIG. 4, at the intersection between first road 302 (i.e., the road on which user 300 is currently traveling on using scooter 100) and second road 304, a decision point for user 300 to select between at least two different destinations from plurality of destinations 204 for guided navigation within geographic area 200 is reached. In this embodiment, user 300 is presented with an option 400 to select between first destination 206 (e.g., The White House) and second destination 208 (e.g., Washington Monument) from plurality of destinations 204.

In an example embodiment, a direction associated with each destination is projected onto the ground surface (e.g., onto the surface of first road 302 and/or second road 304) located in front of personal transport device or scooter 100 using projector 112 on handlebars 102 of scooter 100. As shown in FIG. 4, projector 112 projects a first direction 402 (e.g., left) onto the ground surface that is associated with first destination 206 (e.g., The White House) and projects a second direction 404 (e.g., right) onto the ground surface that is associated with second destination 208 (e.g., Washington Monument). With this arrangement, option 400 allows user 300 to select between at least first destination 206 and second destination 208 of plurality of destinations 204 in geographic area 200 to continue guided navigation.

Figure 5:
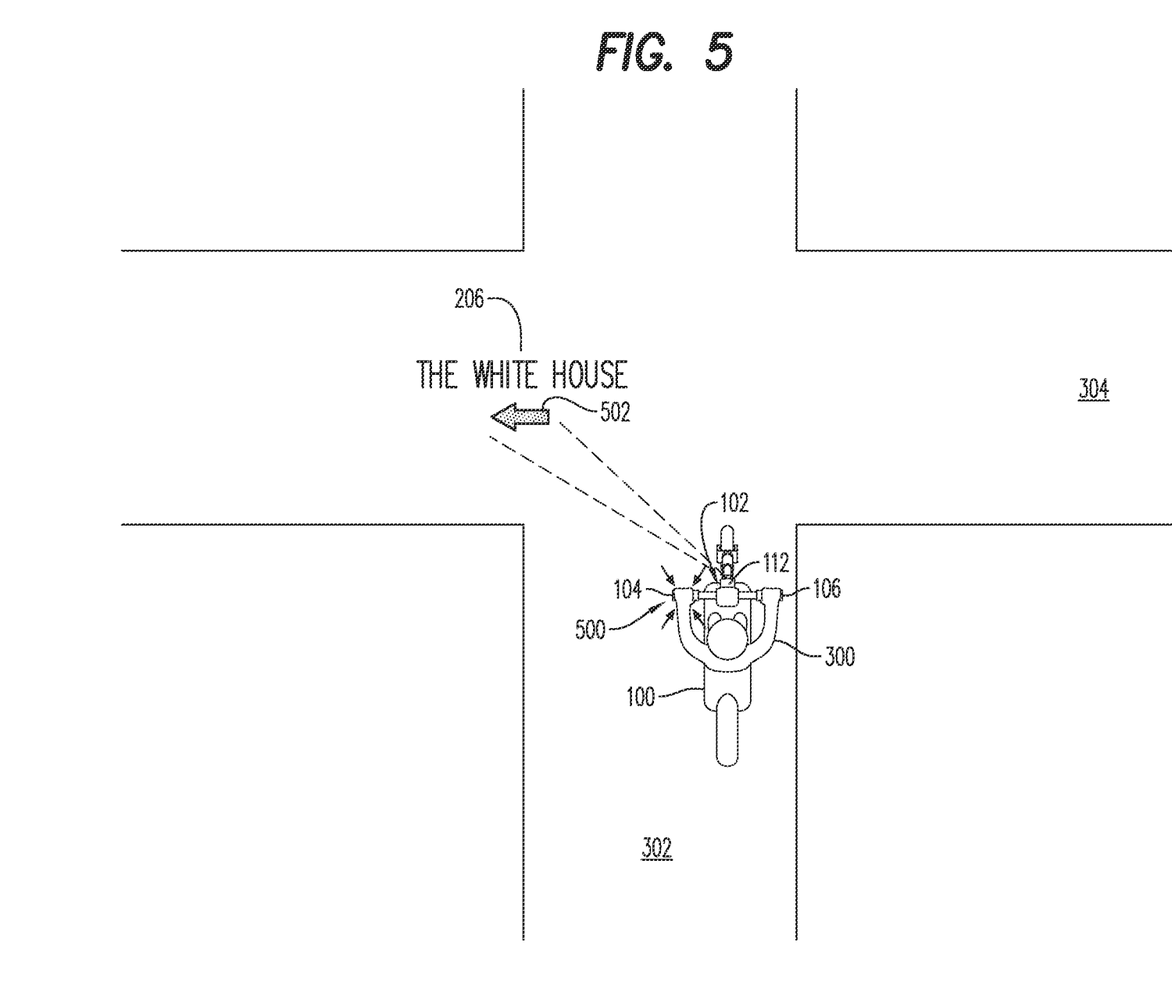
FIG. 5 is a schematic view of a user selecting a direction for guided navigation of a personal transport device in accordance with aspects of the present disclosure.

In some embodiments, a user (e.g., user 300) may use one of a variety of different selection techniques to indicate the user's selection of the desired destination from the option of the two or more destinations. Referring now to FIG. 5, user 300 is shown riding scooter 100 on first road 302. In this embodiment, user 300 selects between first direction 402 (e.g., left) associated with first destination 206 (e.g., The White House) and second direction 404 (e.g., right) associated with second destination 208 (e.g., Washington Monument) by squeezing a corresponding grip (e.g., one of left grip 104 or right grip 106) on handlebars 102 of scooter 100 to indicate a selection 500 between the two destinations.

For example, as shown in FIG. 5, user 300 squeezes left grip 104 to indicate selection 500 of first direction 402 (e.g., left) associated with first destination 206 (e.g., The White House). In this embodiment, left grip 104 and right grip 106 may be provided with a force or pressure sensitive sensor, such as a piezoelectric sensor or similar mechanism, that is configured to detect a squeeze by user 300 as an input to indicate selection 500. Upon input of selection 500 by user 300, projector 112 on scooter 100 projects a projected image 502 (shown here in the form of an arrow) to guide user 300 to the selected first destination 206 (e.g., The White House).

With this arrangement, user 300 makes a left turn onto second road 304 to follow the guided navigation provided by projector 112 to reach first destination 206 of plurality of destinations 204 in geographic area 200.

Figure 6:
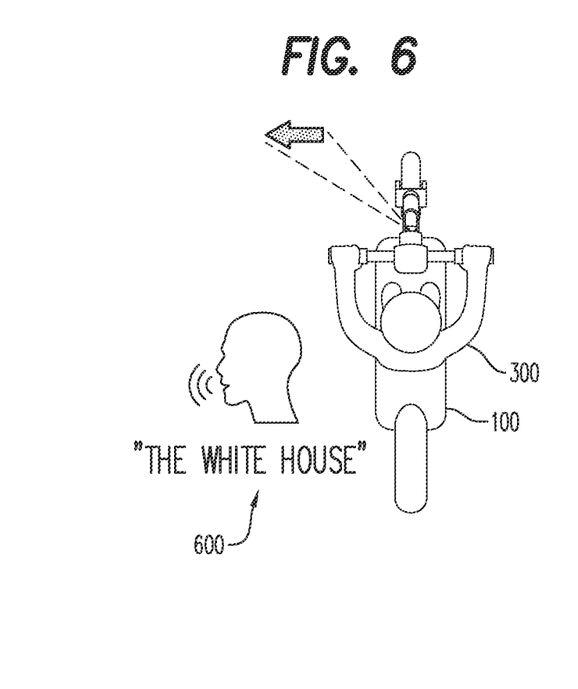
FIG. 6 is a schematic view of an alternate embodiment of a user selection of directions for guided navigation in accordance with aspects of the present disclosure.
Figure 7:
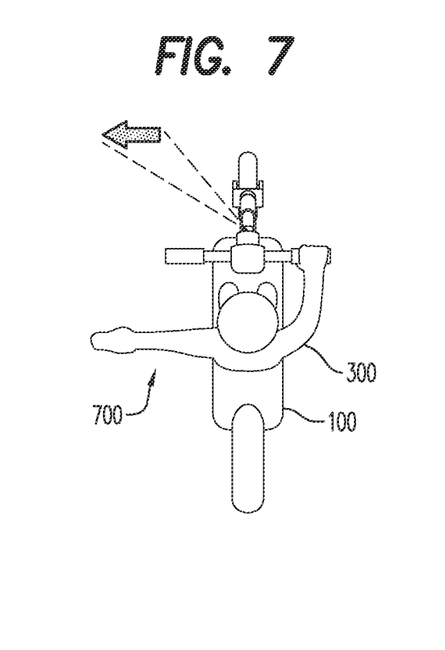
FIG. 7 is a schematic view of another alternate embodiment of a user selection of directions for guided navigation in accordance with aspects of the present disclosure.

In the embodiment shown in FIG. 5, the selection mechanism is in the form of squeezing one of left grip 104 or right grip 106 on handlebars 102 of scooter 100 to indicate selection 500. In some embodiments, other selection mechanisms may be used by user 300 as an input to indicate a selection between the two or more destinations of plurality of destinations 204 in geographic area 200. FIGS. 6 and 7 illustrate examples of alternate selection mechanisms that may be used in accordance with the example embodiments described herein to allow user 300 to indicate selection 500 between two or more destinations.

Referring now to FIG. 6, an alternate embodiment of a selection mechanism of a destination to receive directions for guided navigation is shown. In this embodiment, user 300 on scooter 100 may indicate his or her selection between two or more destinations using a selection mechanism in the form of a verbal or spoken input 600. As shown in FIG. 6, user 300 may speak "The White House" as input 600 to select between first direction 402 (e.g., left) associated with first destination 206 (e.g., The White House) and second direction 404 (e.g., right) associated with second destination 208 (e.g., Washington Monument). In this embodiment, scooter 100 and/or a mobile device associated with user 300 includes a microphone or other sound-receiving mechanism that is configured to detect spoken input 600 as the selection by user 300. A processor associated with scooter 100 and/or the mobile device associated with user 300 also includes software or other components that analyze spoken input 600 to determine the selection by user 300. With this arrangement, user 300 may select between two or more destinations without needing to move his or her hands or otherwise alter the grip on handlebars 102 of scooter 100.

Referring now to FIG. 7, another alternate embodiment of a selection mechanism of a destination to receive directions for guided navigation is shown. In this embodiment, user 300 on scooter 100 may indicate his or her selection between two or more destinations using a selection mechanism in the form of a signaled input 700. As shown in FIG. 7, user 300 may use an arm signal, such as those commonly used by bicyclists, to indicate input 700 to select between first direction 402 (e.g., left) associated with first destination 206 (e.g., The White House) and second direction 404 (e.g., right) associated with second destination 208 (e.g., Washington Monument). In this embodiment, scooter 100 and/or a mobile device associated with user 300 includes a proximity sensor or other motion detecting mechanism that is configured to detect signaled input 700 as the selection by user 300. A processor associated with scooter 100 and/or the mobile device associated with user 300 also includes software or other components that analyze signaled input 700 to determine the selection by user 300. With this arrangement, user 300 may select between two or more destinations using conventional signaling techniques that inform others near user 300 of the user's intentions.

Additionally, in other embodiments, a variety of different inputs by user 300 may be used as a selection mechanism to select between the two or more destinations. For example, a multi-position switch may be provided on handlebars 102, neck 108, and/or deck 110 of scooter 100 that can be operated by a foot or hand of user 300 as an input for the selection mechanism. In another example, a foot or leg sensing mechanism may be used so that user 300 can indicate the selection using his or her foot or leg. In yet another example, scooter 100 may be provided with a gyroscope or accelerometer that is configured to detect movement towards a selected direction associated with one of the two or more destinations, such as by leaning or turning scooter 100 in the selected direction. It should be understood that other selection mechanisms may also be provided in accordance with the present embodiments.

Figure 8:
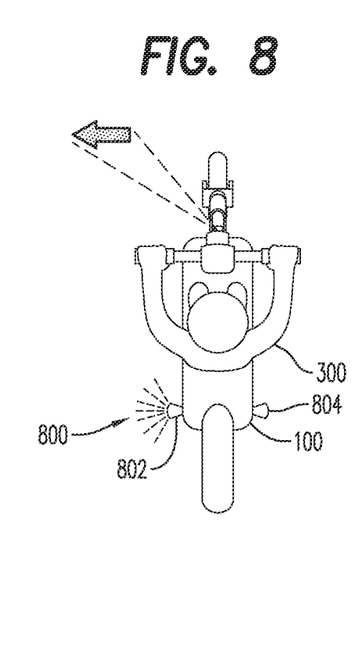
FIG. 8 is a schematic view of an example embodiment of providing an indicator of the user's selection of a direction for guided navigation in accordance with aspects of the present disclosure.

In some embodiments, a user's selection of a direction may be indicated to others nearby, including pedestrians as well as drivers or users of other personal transport devices. Referring now to FIG. 8, an example embodiment of an indicator 800 to show a user's selection of a direction for guided navigation in accordance with aspects of the present disclosure is shown. In an example embodiment, scooter 100 may be provided with signaling mechanisms, including a left turn indicator 802 and a right turn indicator 804, that are configured to provide indicator 800 of the direction selected by user 300 on scooter 100. For example, scooter 100 and/or the mobile device associated with user 300 may use a short-range communication technology, such as Bluetooth®, to communicate a selection (e.g., selection 500) by user 300 of a direction that user 300 intends to turn or travel on scooter 100.

As shown in this embodiment, user 300 has selected first destination 206 (e.g., The White House) that will take user 300 to the left. Accordingly, upon the selection by user 300 to take scooter 100 to the left, indicator 800 is provided by illuminating left turn indicator 802 that corresponds with the direction user 300 is traveling. With this arrangement, others nearby user 300 can be informed of the intentions of user 300 traveling within geographic area 200. In this embodiment, the signaling mechanisms, including left turn indicator 802 and right turn indicator 804, are shown mounted towards a rear portion of deck 110 of scooter 100. In other embodiments, the signaling mechanisms may be mounted in other locations on scooter 100, such as on handlebars 102, neck 108, or elsewhere that may be visible to others near user 300.

Figure 9:
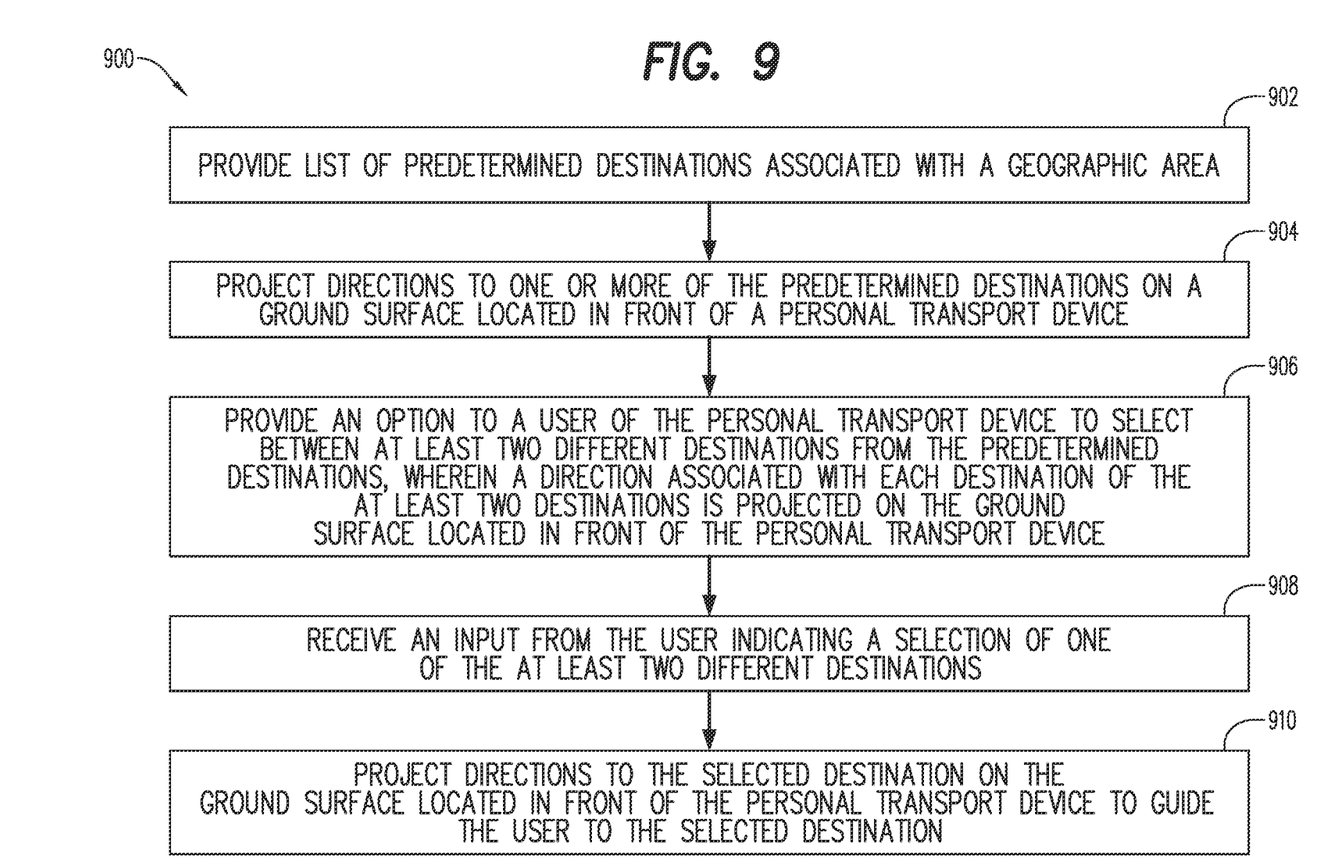
FIG. 9 is a flowchart of an exemplary method for providing guided navigation of a personal transport device in accordance with aspects of the present disclosure.

Referring now to FIG. 9, a flowchart of a method 900 for providing guided navigation of a personal transport device in accordance with aspects of the present disclosure is shown. In some embodiments, method 900 may be implemented by a computer or processor associated with a personal transport device and/or a mobile device of a user, as described above. In an example embodiment, method 900 may begin with an operation 902. At operation 902, a list of predetermined destinations associated with a geographic area is provided. For example, at operation 902, a list of predetermined destinations, including plurality of destinations 204, associated with geographic area 200 may be provided to user 300 of personal transport device 100, as described above.

Next, at an operation 904, method 900 includes projecting directions to one or more of the predetermined destinations on a ground surface located in front of a personal transport device. For example, operation 904 may include using projector 112 on scooter 100 to project directions onto ground surface 116 in front of scooter 100, as shown in FIG. 1. Method 900 also includes an operation 906. At operation 906, an option is provided to a user of the personal transport device to select between at least two different destinations from the predetermined destinations. Additionally, at operation 906, a direction associated with each destination of the at least two destinations is projected on the ground surface located in front of the personal transport device.

For example, as described above in reference to FIG. 4, at operation 906, option 400 may be provided to user 300 of scooter 100 to select between first destination 206 (e.g., The White House) and second destination 208 (e.g., Washington Monument) from plurality of destinations 204. Additionally, at operation 906, projector 112 of scooter 100 may project first direction 402 (e.g., left) onto the ground surface that is associated with first destination 206 (e.g., The White House) and second direction 404 (e.g., right) onto the ground surface that is associated with second destination 208 (e.g., Washington Monument), as shown in FIG. 4.

Next, method 900 includes an operation 908 where an input is received from the user of the personal transport device indicating a selection of one of the at least two different destinations. For example, at operation 908, an input may be received when user 300 squeezes left grip 104 on handlebars 102 of scooter to indicate selection 500 of first direction 402 (e.g., left) associated with first destination 206 (e.g., The White House). Operation 908 may include other inputs from user 300 that indicate a selection, including any one or more of the selection mechanisms described above in reference to FIGS. 5, 6, and 7. Moreover, in some embodiments, operation 906 may further include providing an indicator of the direction selected by the user. For example, as described above in reference to FIG. 8, user 300 on scooter 100 may use left turn indicator 802 or right turn indicator 804 to provide indicator 800 of the direction selected by user 300.

Method 900 also includes an operation 910. At operation 910, directions to the selected destination are projected on the ground surface located in front of the personal transport device to guide the user to the selected destination. For example, at operation 910, upon input of selection 500 by user 300, projector 112 on scooter 100 projects projected image 502 (shown in the form of an arrow) onto the surface of first road 302 and/or second road 304 to guide user 300 to the selected first destination 206 (e.g., The White House). With this arrangement, guided navigation for personal transport devices to destinations in a geographic area may be provided.

The techniques described herein provide for a method and system that allows a user of a personal transport device to receive guided navigation to one or more destinations in a given geographic area and to easily select between two or more destinations or sites using different selection techniques. With this arrangement, a user may select between a plurality of predetermined destinations in a geographic area to create a customized or personalized set of selected destinations in the geographic area and receive guided navigation that is curated to the user's specific interests and selections.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method for providing guided navigation to destinations in a geographic area, the method comprising:
    projecting directions to one or more destinations on a ground surface located in front of a personal transport device;
    providing an option to a user of the personal transport device to select between at least two different destinations, wherein a direction associated with each destination of the at least two destinations is projected on the ground surface located in front of the personal transport device;
    receiving an input from the user indicating a selection of one of the at least two different destinations; and
    projecting directions to the selected destination on the ground surface located in front of the personal transport device to guide the user to the selected destination.

2. The method according to claim 1, wherein projecting the directions is performed by a projector associated with the personal transport device.

3. The method according to claim 1, wherein receiving the input from the user includes squeezing one of a left grip or a right grip on handlebars of the personal transport device to indicate the selection.

4. The method according to claim 1, wherein receiving the input from the user includes detecting a spoken input from the user to indicate the selection.

5. The method according to claim 1, wherein receiving the input from the user includes detecting an arm motion or a leg motion from the user to indicate the selection.

6. The method according to claim 1, wherein receiving the input from the user includes detecting movement towards the selected direction by a gyroscope or accelerometer associated with the personal transport device.

7. The method according to claim 1, wherein the direction associated with each destination of the at least two destinations is projected on the ground surface of a first road as the user approaches a second road that intersects with the first road.

8. A method for providing guided navigation to a user of a personal transport device, the method comprising:
    providing a projector configured to be attached to a personal transport device;
    projecting directions to one or more of a plurality of destinations in a geographic area on a ground surface located in front of the personal transport device, as a user of the personal transport device is riding the personal transport device;
    projecting an image of a direction associated with each destination of at least two different destinations from the plurality of destinations on the ground surface located in front of the personal transport device;
    receiving an input from a selection mechanism associated with the personal transport device, the input indicating a selection of one of the at least two different destinations by the user; and
    projecting directions to the selected destination on the ground surface located in front of the personal transport device to guide the user to the selected destination.

9. The method according to claim 8, wherein the image of the direction associated with each destination of the at least two destinations is projected on the ground surface of a first road as the user approaches a second road that intersects with the first road.

10. The method according to claim 8, wherein receiving the input from the selection mechanism includes detecting the user squeezing one of a left grip or a right grip on handlebars of the personal transport device to indicate the selection.

11. The method according to claim 8, wherein receiving the input from the selection mechanism includes detecting a spoken input from the user to indicate the selection.

12. The method according to claim 8, wherein receiving the input from the selection mechanism includes detecting an arm motion or a leg motion from the user to indicate the selection.

13. The method according to claim 8, further comprising providing a list of predetermined destinations associated with the geographic area that includes the plurality of destinations based on user preferences.

14. The method according to claim 8, wherein the directions are provided by a mobile device associated with the user that is configured to communicate with the personal transport device using a short range communication technology.

15. A system for providing guided navigation to a user of a personal transport device, comprising:
- a projector configured to mount to the personal transport device, wherein the projector is configured to project directions to one or more of a plurality of destinations in a geographic area on a ground surface located in front of the personal transport device;
- a mobile device associated with the user that is configured to communicate with the personal transport device using a short range communication technology; and
- a selection mechanism associated with the personal transport device, the selection mechanism configured to allow the user of the personal transport device to select between at least two different destinations from the plurality of destinations by choosing an image of a direction associated with each destination of the at least two destinations that is projected on the ground surface located in front of the personal transport device.

16. The system according to claim 15, wherein the projector is mounted to handlebars of the personal transport device.

17. The system according to claim 15, wherein the selection mechanism is a left grip and a right grip on handlebars of the personal transport device.

18. The system according to claim 15, wherein the selection mechanism is a microphone of the mobile device that is configured to detect a spoken input from the user.

19. The system according to claim 15, wherein the selection mechanism is a proximity sensor configured to detect motion of an arm or a leg of the user.

20. The system according to claim 15, wherein the projector is configured to project the image of the direction associated with each destination of the at least two destinations on the ground surface of a first road as the user approaches a second road that intersects with the first road.

\* \* \* \* \*